(12) United States Patent
Ito et al.

(10) Patent No.: US 11,130,360 B2
(45) Date of Patent: Sep. 28, 2021

(54) SEAL-TYPE THERMAL TRANSFER IMAGE-RECEIVING SHEET

(71) Applicant: Dai Nippon Printing Co., Ltd., Tokyo (JP)

(72) Inventors: Hideo Ito, Tokyo (JP); Masayuki Tani, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/492,756

(22) PCT Filed: Sep. 20, 2017

(86) PCT No.: PCT/JP2017/033935
§ 371 (c)(1),
(2) Date: Sep. 10, 2019

(87) PCT Pub. No.: WO2018/179505
PCT Pub. Date: Oct. 4, 2018

(65) Prior Publication Data
US 2020/0070559 A1   Mar. 5, 2020

(30) Foreign Application Priority Data

Mar. 29, 2017  (JP) .............................. JP2017-066096

(51) Int. Cl.
*B41M 5/50*  (2006.01)
(52) U.S. Cl.
CPC ........ *B41M 5/502* (2013.01); *Y10T 428/2486* (2015.01); *Y10T 428/24843* (2015.01); *Y10T 428/24942* (2015.01)
(58) Field of Classification Search
CPC . B41M 5/502; B41M 5/52; B32B 7/06; Y10T 428/24843; Y10T 428/2486; Y10T 428/24942

(Continued)

(56) References Cited

U.S. PATENT DOCUMENTS

| 2002/0006492 A1 | 1/2002 | Morikawa et al. |
| 2016/0303884 A1 | 10/2016 | Tani et al. |
| 2020/0070559 A1* | 3/2020 | Ito ............................. B32B 7/06 |

FOREIGN PATENT DOCUMENTS

| JP | H11-106717 A1 | 4/1999 |
| JP | H11-296085 A1 | 10/1999 |

(Continued)

OTHER PUBLICATIONS

International Search Report and Written Opinion (Application No. PCT/JP2017/033935) dated Nov. 7, 2017.

*Primary Examiner* — Betelhem Shewareged
(74) *Attorney, Agent, or Firm* — Burr & Brown, PLLC

(57) ABSTRACT

Provided is a seal-type thermal transfer image-receiving sheet capable of providing a seal section having novel designability. A seal-type thermal transfer image-receiving sheet includes a release section and a seal section integrated. The seal section is provided peelably from the release section. The seal section has a layered structure in which a pressure-adhesive layer and a receiving layer capable of receiving a sublimable dye are layered in the order mentioned from the side of the release section. When the seal section is peeled off from the release section, a reference plate and the seal section peeled off are superposed together, and a reflection density of the reference plate is measured from the side of the seal section, the value of the reflection density is 15% or more, on the presupposition that the reflection density of the reference plate before the superposition with the seal section is set to 100%.

3 Claims, 2 Drawing Sheets

(58) Field of Classification Search
USPC .................................................... 428/39.39
See application file for complete search history.

(56) References Cited

FOREIGN PATENT DOCUMENTS

| | | |
|---|---|---|
| JP | 2000-227759 A1 | 8/2000 |
| JP | 2001-183982 A1 | 7/2001 |
| JP | 2001-315443 A1 | 11/2001 |
| JP | 2002-002127 A1 | 1/2002 |
| JP | 2002-019309 A1 | 1/2002 |
| JP | 2004-264666 A1 | 9/2004 |
| JP | 4372969 B2 | 11/2009 |
| JP | 4372974 B2 | 11/2009 |
| JP | 3179946 U | 11/2012 |
| WO | 2015/093339 A1 | 6/2015 |

* cited by examiner

SEAL-TYPE THERMAL TRANSFER IMAGE-RECEIVING SHEET

FIELD OF THE INVENTION

The present invention relates to a seal-type thermal transfer image-receiving sheet.

BACKGROUND OF THE INVENTION

Various thermal transfer methods have been conventionally suggested. Among these, sublimation type thermal transfer method has been widely used to form a thermal transfer image on a transfer receiving article because such method can easily form high-quality images having excellent transparency, having high reproducibility and high gradation of neutral tints, and being equivalent to conventional full-color photographic images. For forming a thermal transferred image by the sublimation type thermal transfer method, a thermal transfer sheet having a dye layer provided on one surface of a substrate and a transfer receiving article, for example, a thermal transfer image-receiving sheet having a receiving layer provided on one surface of another substrate, are used. Then, the receiving layer of the thermal transfer image-receiving sheet and the dye layer of the thermal transfer sheet are superposed together, and heat is applied by a thermal head from the back side of the thermal transfer sheet to allow the dye in the dye layer to migrate onto the receiving layer. Thereby a print in which a thermal transferred image is formed on the receiving layer can be obtained. According to the sublimation type thermal transfer method, the amount of the dye to migrate can be controlled by the amount of energy to be applied to the thermal transfer sheet. Thus, this method can form a high quality print in which an image is very vivid, of which transparency, color reproducibility and gradation of halftones are excellent, and which is comparable to a full-color photographic image.

Thermal transfer image-receiving sheets to be used for such thermal transfer method include a wide range of applications, and are used in applications, for example, output of picture of face to an identification paper, ID card, credit card, or other cards, composite photographs or souvenir photographs at amusement facilities, and the like.

Among diversified applications as described above, there is a demand to use by affixing a seal (label) having an image to any object. For example, Patent Literature 1 suggests a thermal transfer image-receiving sheet in which a sheet having a hologram pattern having a highly decorative effect is used as a substrate, the seal-type thermal transfer image-receiving sheet having a pressure-sensitive adhesive layer on the back face of the substrate. Patent Literature 2 suggests a seal-type thermal transfer image-receiving sheet in which a coloring layer having a metal component and fluorescence is provided between a receiving layer and a substrate, and a pressure-sensitive adhesive layer is provided on the back face of the substrate. It is said that according to these seal-type thermal transfer image-receiving sheets, design and decorative effects can be enhanced.

CITATION LIST

Patent Literature

Patent Literature 1: Japanese Patent No. 4372969
Patent Literature 2: Japanese Patent No. 4372974

SUMMARY OF THE INVENTION

Technical Problem

It is a principal object of the present invention to provide, among a seal-type thermal transfer image-receiving sheets as described above, a seal-type thermal transfer image-receiving sheet having novel designability.

Solution to Problem

A seal-type thermal transfer image-receiving sheet according to an embodiment of the present disclosure for solving the above problems is a seal-type thermal transfer image-receiving sheet including a release section and a seal section integrated, wherein the seal section is provided peelably from the release section, the seal section has a layered structure in which a pressure-adhesive layer and a receiving layer capable of receiving a sublimable dye are layered in the order mentioned from the side of the release section, and when the seal section is peeled off from the release section, a reference plate and the seal section peeled off are superposed together, and the reflection density of the reference plate is measured from the side of the seal section, the value of the reflection density is 15% or more of the value of the reference plate alone.

Alternatively, in the seal-type thermal transfer image-receiving sheet described above, when the reference plate and the release section from which the seal section is peeled off are superposed together and the reflection density of the reference plate is measured from the side of the release section, the value of the reflection density may be 15% or more of the value of the reflection density of the reference plate alone.

Alternatively, in the seal-type thermal transfer image-receiving sheet described above, when the reference plate and the seal-type thermal transfer image-receiving sheet are superposed together and the reflection density of the reference plate is measured from the side of the seal-type thermal transfer image-receiving sheet, the value of the reflection density may be 15% or more of the reflection density of the reference plate alone.

Alternatively, the dynamic friction coefficient between surfaces of the release section not located on the side of the seal section may be 0.24 or more, the dynamic friction coefficient being measured in compliance with JIS-P-8147 (2010).

Advantageous Effects of Invention

According to a seal-type thermal transfer image-receiving sheet according to an embodiment of the present disclosure, it is possible to impart novel designability to the seal-type thermal transfer image-receiving sheet.

DETAILED DESCRIPTION OF THE INVENTION

Figure 1:
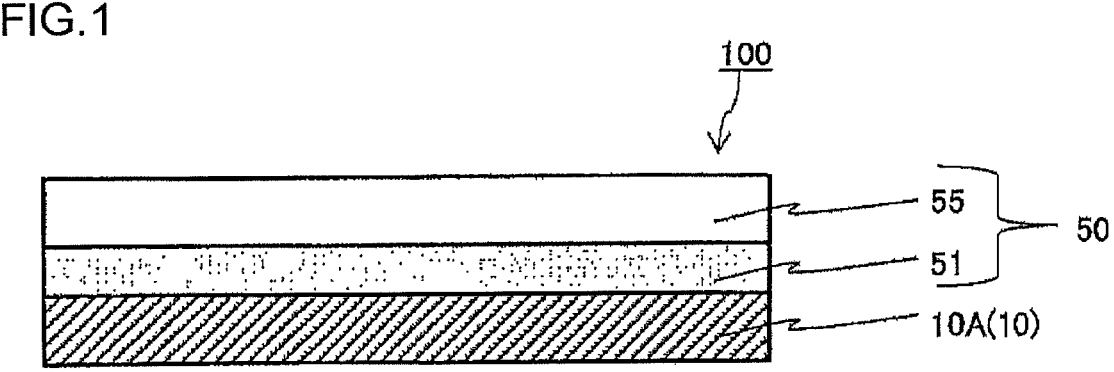
FIG. 1 is a schematic sectional view showing an example of a seal-type thermal transfer image-receiving sheet of one embodiment.

Hereinbelow, embodiments of the present invention will be described with reference to the drawings and the like. The present invention may be embodied in many different forms and should not be construed as being limited to the description of the exemplary embodiment below. In the drawings, components may be shown schematically regarding the width, thickness, and the like, instead of being shown in accordance with the actual forms, for the sake of clearer illustration. The schematic drawings are merely examples and do not limit the interpretations of the present invention in any way. In the specification and the drawings, components that have substantially the same functions as those described before with reference to a previous drawing(s) bear the identical reference signs thereto, and detailed descriptions thereof may be omitted as appropriate.

<<Seal-Type Thermal Transfer Image-Receiving Sheet>>

Figure 2:
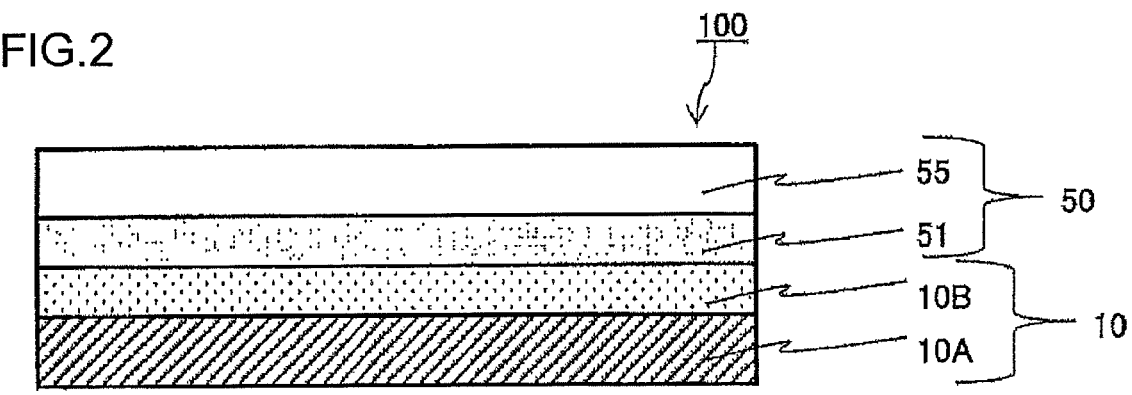
FIG. 2 is a schematic sectional view showing an example of a seal-type thermal transfer image-receiving sheet of one embodiment.
Figure 3:
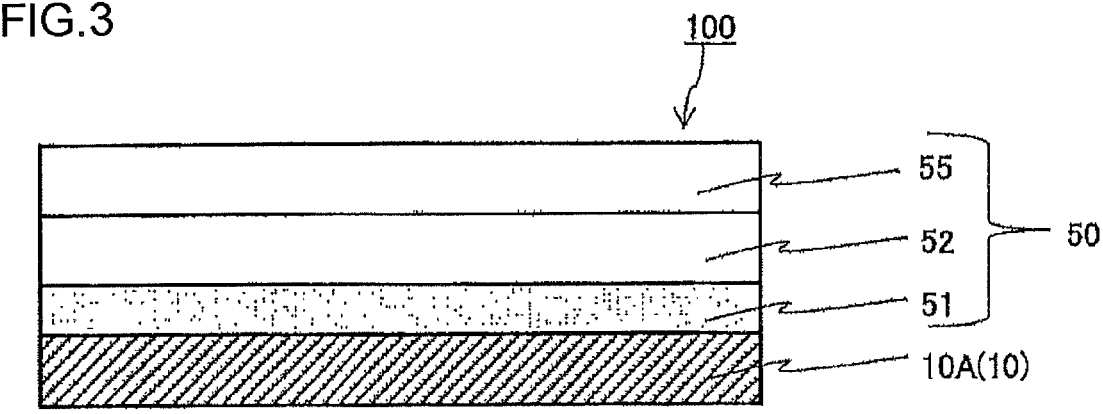
FIG. 3 is a schematic sectional view showing an example of a seal-type thermal transfer image-receiving sheet of one embodiment.

As shown in FIG. 1 to FIG. 3, a seal-type thermal transfer image-receiving sheet 100 according to an embodiment of the present disclosure (hereinbelow, it is referred to as a seal-type thermal transfer image-receiving sheet of one embodiment) includes a release section 10 and a seal section 50, which are integrated, and the seal section 50 is provided peelably from the release section 10. The seal section 50 has a layered structure in which a pressure-adhesive layer 51 and a receiving layer 55 capable of receiving a sublimable dye are layered in the order mentioned from the side of the release section 10.

Figure 4A:
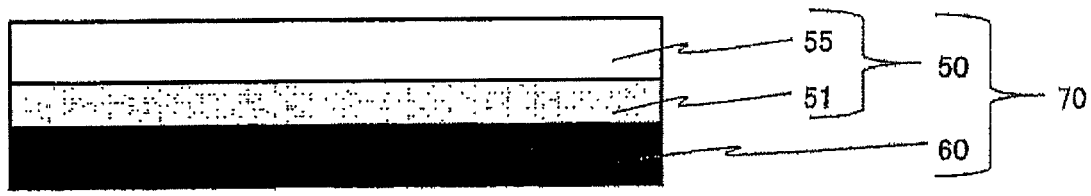
FIG. 4(A) is a schematic sectional view of a reference plate having a seal section.

The seal-type thermal transfer image-receiving sheet 100 of one embodiment is characterized in that, when the seal section 50 is peeled off from the release section 10, a reference plate 60 and the seal section 50 peeled off are superposed together as shown in FIG. 4(A), and the reflection density of a reference plate 60 is measured from the side of the seal section 50, the value of the reflection density is 15% or more of the value of the reflection density of the reference plate 60 alone. In other words, the sheet 100 is characterized in that, when the reference plate 60 and the seal section 50 peeled off are superposed together and the reflection density of the reference plate 60 is measured from the side of the seal section 50, the percentage of the value of the reflection density is 15% or more, on the presupposition that the value of the reflection density of the reference plate 60 before the superposition with the seal section 50 is set to 100%. Hereinbelow, the superposed product of the reference plate 60 and the seal section 50 peeled off may be referred to as the reference plate having a seal section (see sign 70 in FIG. 4(A)), and the percentage of the value of the reflection density of the reference plate having a seal section 70 on the basis of the value of the reflection density of the reference plate 60 alone may be referred to as the percentage of the reflection density of the reference plate having a seal section.

According to the seal-type thermal transfer image-receiving sheet 100 of one embodiment, in which the percentage of the reflection density of the reference plate having a seal section 70 is specified as 15% or more, it is possible to impart novel designability to the seal section 50 to be peeled off from the release section 10. Concretely, it is possible to impart a see-through feeling to the seal section 50. As the reflection density of the reference plate having a seal section 70 increases, the see-through feeling of the seal section 50 becomes higher.

The reflection density of the reference plate 60 and the reflection density of the reference plate having a seal section 70 can be measured using a reflection densitometer. When a reflection plate of which reflection density is known is used as the reference plate 60, it is not necessary to measure the reflection density of the reference plate 60 alone, in other words, the reflection density of the reference plate 60 before the superposition with the seal section 50. Examples of the reference plate 60 of which reflection density is known can include a calibration plate accompanying a reflection densitometer.

Hereinbelow, each constituent of a seal-type thermal transfer image-receiving sheet 100 of one embodiment will be concretely described. The seal-type thermal transfer image-receiving sheet 100 of one embodiment is only required to satisfy a condition of the percentage of the reflection density of the reference plate having a seal section 70 being 15% or more, and is not limited to the embodiments shown below.

<Release Section>

A release section 10 is an essential constituent in the seal-type thermal transfer image-receiving sheet 100 of one embodiment. The release section 10 is not particularly limited, and the release section 10 as an example is constituted by a substrate 10A (hereinbelow, sometimes referred to as a substrate for release section). The release section 10 may be made of one constituent member or may be a laminate of a plurality of constituent members. For example, as shown in FIG. 1, the release section 10 may be constituted only by the substrate 10A, or as shown in FIG. 2, the release section 10 may have a layered structure of the substrate 10A and another layer, for example, a release layer 10B. Alternatively, the release section 10 may have a structure other than these.

(Substrate for Release Section)

As the substrate for release section 10A, stretched or unstretched substrates (which may be films) of plastics, for example, polyester resins such as polyethylene terephthalate and polyethylene naphthalate, polypropylene resins, polycarbonate resins, cellulose acetate resins, polyethylene derivatives, polyamide resins, and polymethylpentene resins, wood-free paper, coated paper, resin coated paper, art paper, cast coated paper, cardboard, emulsion-impregnated paper, synthetic rubber latex-impregnated paper, synthetic resin-filled paper, cellulose fiber paper, and the like can be enumerated. As the substrate for release section 10A, a substrate (film) having voids therein or the like may be used. The substrate having voids can be appropriately selected from those described in a substrate for seal section 52 mentioned below and used.

The thickness of the substrate for release section 10A may be determined in consideration of the thickness of the entire seal-type thermal transfer image-receiving sheet 100 and the like. As an example, the range of 50 μm or more and 125 μm or less can be mentioned.

In order to enhance the peelability of a seal section 50 from the release section 10, a laminate of the substrate for release section 10A and the release layer 10B can be used as the release section 10, as shown in FIG. 2.

As components of the release layer 10B, components having a release property, for example, waxes, silicone waxes, silicone resins, various silicone modified resins such as silicone modified acrylic resins, fluorine resins, fluorine modified resins, polyvinyl alcohol, acrylic resins, thermosetting epoxy-amino copolymers and thermosetting alkyd-amino copolymers (thermosetting aminoalkyd resins), melamine resins, cellulose type resins, urea type resins, polyolefin type resins, acryl type resins, cellulosic resins, and the like can be enumerated. The release layer 10B may contain one component singly or may contain two or more components.

As one example of the thickness of the release layer 10B, the range of 0.1 μm or more and 0.4 μm or less can be mentioned.

Alternatively, a primer layer (not shown) may be provided between the substrate for release section 10A and the release layer 10B. On the surface opposite to the surface on which the release layer 10B of the substrate for release section 10A is to be provided, a back face layer (not shown) or the like may be provided. Alternatively, a back face primer layer may be provided between the substrate for release section 10A and the back face layer. The primer layer, back face layer, and back face primer layer are optional layers constituting the release section 10.

Figure 4B:
FIG. 4(B) is a schematic sectional view of a reference plate having a release section.

As shown in FIG. 4(B), the structure may be such that, when the release section 10 peeled off from the seal section 50 and a reference plate 60 are superposed together and the reflection density of the reference plate 60 is measured from the side of the release section 10, the value of the reflection density is 15% or more of the value of the reflection density of the reference plate 60 alone. Hereinbelow, the superposed product of the release section 10 and the reference plate 60 may be referred to as the reference plate having a release section (see sign 80 in FIG. 4(B)), and the percentage of the value of the reflection density of the reference plate having a release section 80 on the basis of the value of the reflection density of the reference plate 60 alone may be referred to as the percentage of the reflection density of the reference plate having a release section. It is possible to impart novel designability not only to the seal section 50 but also to the entire seal-type thermal transfer image-receiving sheet 100 by setting the percentage of the reflection density of the reference plate having a release section 80 to 15%.

Figure 4C:
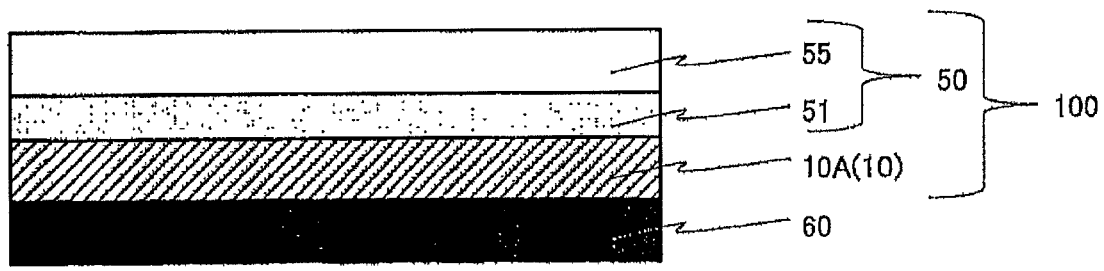
FIG. 4(C) is a schematic sectional view showing a state in which the seal-type thermal transfer image-receiving sheet and the reference plate are superposed together.

Alternatively, as shown in FIG. 4(C), the structure may be such that, when the seal-type thermal transfer image-receiving sheet 100 and the reference plate 60 are superposed together and the reflection density of the reference plate 60 is measured from the side of the seal section 50, the value of the reflection density is 15% or more on the basis of the value of the reflection density of the reference plate 60 alone. It is possible to impart novel designability to the entire seal-type thermal transfer image-receiving sheet 100 also by means of this structure.

As a device to set the percentage of the reflection density of the reference plate having a release section 80 to 15% or more, (i) a device for reducing the thickness of each constituent member constituting the release section 10, (ii) a device for selecting the material of each constituent member, (iii) a device combining (i) and (ii), and the like can be enumerated. It is possible to adjust the percentage of the reflection density of the reference plate having a release section 80 to be 15% or more, by use of a stretched or unstretched film of plastics, for example, polyesters such as polyethylene terephthalate and polyethylene naphthalate, polypropylene, polycarbonate, cellulose acetate, polyethylene derivatives, polyamides, and polymethylpentene, as the substrate for release section 10A, by reducing the thickness of the other layer(s) (e.g., the release layer 10B, back face layer, back face primer layer to be provided as required), or by using a layer having transparency as other layer(s).

The dynamic friction coefficient between the surfaces not located on the side of the seal section 50 (the lower surfaces of the release section 10 in the forms shown in FIG. 1 to FIG. 3) among the surfaces of the release section 10, which is measured in compliance with JIS-P-8147 (2010), is preferably 0.24 or more. In other words, when the seal-type thermal transfer image-receiving sheet 100 of one embodiment is conveyed in a printer, the dynamic friction coefficient between the surfaces of the seal-type thermal transfer image-receiving sheet 100 to be in contact with the conveying member of the printer, which is measured in compliance with JIS-P-8147 (2010), is preferably 0.24 or more. Hereinbelow, the dynamic friction coefficient referred to herein means a dynamic friction coefficient to be measured in compliance with JIS-P-8147 (2010).

By providing a release section 10 of a preferable form, it is possible to enhance the conveyance of the seal-type thermal transfer image-receiving sheet 100 of one embodiment having the release section 10 in a printer. By enhancing the conveyance of the seal-type thermal transfer image-receiving sheet 100 of one embodiment in a printer, it is possible to suppress occurrence of meandering, which may occur when the seal-type thermal transfer image-receiving sheet is conveyed, wrinkles in a thermal transferred image to be formed on the receiving layer 55 of the seal section 50, and the like.

The method for setting the dynamic friction coefficient between the surfaces not located on the side of the seal section 50, among the surfaces of the release section 10, to 0.24 or more is not particularly limited. For example, in the release section 10 of the forms shown in FIG. 1 to FIG. 3, a substrate that provides a dynamic friction coefficient of 0.24 or more may be used, as the substrate for release section 10A constituting the release section 10.

When the dynamic friction coefficient between the surfaces of the release section is less than 0.24 in the release section 10 of the forms shown in FIG. 1 to FIG. 3, that is, when the dynamic friction coefficient between the surfaces of the substrate for release section 10A is less than 0.24 in the release section 10 of the forms shown in FIG. 1 to FIG. 3, the structure may be such that another layer (not shown) is located on the outermost surface on the side not in contact with the seal section 50 of the release section 10 and the dynamic friction coefficient between the surfaces of the release section 10 is set to 0.24 or more by means of the other layer. As examples of the other layer, a back face layer and the like can be mentioned.

As the components of the back face layer, thermoplastic resins such as polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl acetal resins such as polyvinyl butyral resins and polyvinyl acetoacetal resins, silicone-modified forms of these, and the like can be enumerated. When the back face layer is located on the outermost surface of the release section 10 and the dynamic friction coefficient between the back face layers is set to 0.24 or more, components that allows the dynamic friction coefficient between the back face layers to be 0.24 or more may be appropriately selected from these components, or these components may be used in combination. It is also possible to allow the dynamic friction coefficient between the surfaces of the back face layer to be 0.24 or more by combining various resin components with various particles. As the various particles, for example, porous silica particles, nylon particles, and the like can be preferably used.

Alternatively, a back face primer layer may be provided between the substrate for release section 10A and the back face layer.

<Seal Section>

As shown in FIGS. 1 and 2, on the release section 10, the seal section 50 is provided peelably from the release section 10. The seal section 50 has a layered structure in which a pressure-adhesive layer 51 and a receiving layer 55 capable of receiving a sublimable dye (hereinbelow, it is referred to as a receiving layer) are layered in the order mentioned from the side of the release section 10. The seal section 50 may be constituted only by the pressure-adhesive layer 51 and the receiving layer 55 or may contain an optional layer other than these. For example, as shown in FIG. 3, the seal section 50 may have a layered structure in which the pressure-adhesive layer 51, a substrate for seal section 52, and the receiving layer 55 are layered in the order mentioned from the side of the release section 10. In the forms shown in FIG. 1 to FIG. 3, a primer layer (not shown) may be provided between all or some of the layers (between all or some of the constituent members) constituting the seal section 50. For example, a primer layer may be provided between the substrate for seal section 52 and the receiving layer 55.

(Pressure-Adhesive Layer)

The pressure-adhesive layer 51 constitutes the seal section 50 of the seal-type thermal transfer image-receiving sheet 100 of one embodiment. The components of the pressure-adhesive layer 51 are not particularly limited, and components that can adjust the percentage of the reflection density of the reference plate having a seal section 70 to be 15% or more can be appropriately selected and used. As the components of the pressure-adhesive layer 51, acrylic resins, vinyl type resins, polyester type resins, urethane type resins, polyamide type resins, epoxy type resins, rubber type resins, ionomer resins, and the like can be enumerated. The thickness of the pressure-adhesive layer 51 is not particularly limited, and is generally in the range of 5 µm or more and 20 µm or less, preferably in the range of 8 µm or more and 10 µm or less. It is also possible to adjust the percentage of the reflection density of the reference plate having a seal section 70 to be 15% or more by appropriately adjusting the thickness of the pressure-adhesive layer 51, for example, by reducing the thickness of the pressure-adhesive layer 51.

(Receiving Layer)

The receiving layer 55 capable of receiving a sublimable dye is provided directly or indirectly, via other optional layers, on the pressure-adhesive layer 51. The receiving layer 55 is a layer constituting the seal section 50 of the seal-type thermal transfer image-receiving sheet 100 of one embodiment. Any of optional layers located between the pressure-adhesive layer 51 and the receiving layer 55 constituting the seal section 50 will be layers constituting the seal section 50.

The components of the receiving layer 55 are not particularly limited, and components that can adjust the percentage of the reflection density of the reference plate having a seal section 70 to be 15% or more can be appropriately selected and used. As the components of the receiving layer 55, polyolefin type resins such as polypropylene, halogenated resins such as polyvinyl chloride or polyvinylidene chloride, vinyl type resins such as polyvinyl acetate, vinyl chloride-vinyl acetate copolymers, ethylene-vinyl acetate copolymers, or polyacrylic esters, polyester resins such as polyethylene terephthalate or polybutylene terephthalate, polystyrene type resins, polyamide type resins, copolymers of an olefin such as ethylene or propylene and another vinyl polymer, ionomers or cellulose type resins such as cellulose diacetate, polycarbonate, and solvent-type resins such as acrylic resins, and the like can be enumerated. One of these materials may be used singly, or two or more of these may be used in combination. The thickness of the receiving layer 55 is not particularly limited, and is preferably in the range of 0.5 µm or more and 10 µm or less, more preferably in the range of 2 µm or more and 5 µm or less.

(Substrate for Seal Section)

As shown in FIG. 3, the substrate for seal section 52 may be provided between the pressure-adhesive layer 51 and the receiving layer 55, in order to suppress the loss of energy applied from a heating member as well as to support the seal section 50, when an image is formed on the receiving layer 55.

As the substrate for seal section 52, a substrate that can adjust the percentage of the reflection density of the reference plate having a seal section 70 to be 15% or more can be appropriately selected and used. As the substrate for seal section 52, stretched or unstretched substrates (which may be films) of plastics, for example, polyesters such as polyethylene terephthalate and polyethylene naphthalate, polypropylene, polycarbonate, cellulose acetate, polyethylene derivatives, polyamides, polymethylpentene, and the like can be enumerated. The substrate for seal section 52 may be the one having a single-layer structure, or may be a composite substrate in which two or more substrates are layered.

In addition to or instead of the substrate for seal section 52 exemplified above, a substrate (which may be a film) having voids can be used as the substrate for seal section 52. The substrate having voids serves as a heat insulation layer. Providing a substrate (film) having voids, as the substrate for seal section 52, between the pressure-adhesive layer 51 and the receiving layer 55 enables an image having a high density to be formed on the receiving layer 55. When a substrate having voids is used as the substrate for seal section 52, the percentage of the reflection density of the reference plate having a seal section 70 tends to decrease. Thus, it is necessary to appropriately adjust the thickness of the substrate such that the percentage of the reflection density of the reference plate having a seal section 70 does not fall below 15%.

As the substrate having voids, for example, polyolefin type resin substrates having voids therein can be mentioned. As the polyolefin type resin, polyethylene, polyesters having high heat resistance such as polyethylene terephthalate and polyethylene naphthalate, polyolefin type resins such as polypropylene, polybutene, polyisobutene, polyisobutylene, polybutadiene, polyisoprene, and ethylene-vinyl acetate copolymers, and the like can be enumerated.

The resin substrate having voids therein can be obtained by two methods described below, for example. One is a method in which inorganic fine particles are kneaded into a polymer, and the compound is stretched to generate microvoids by using the inorganic fine particles as cores. The other is a method including preparing a compound in which a polymer(s) (one polymer or a plurality of polymers may be used) immiscible to a base resin is blended. When this compound is observed microscopically, polymers mutually form a fine sea-island structure. Stretching this compound leads to delamination of the sea-island interface or large deformation of polymers forming the islands to thereby generate voids.

The thickness of the substrate for seal section 52 is preferably in the range of 50 μm or more and 100 μm or less.
(Primer Layer)

A primer layer (not shown) to enhance the interlayer adhesion may be provided between each constituent members (between each layers) constituting the seal section 50. The primer layer may be provided between all the layers constituting the seal section or may be provided between some of the layers. For example, in the case where the substrate for seal section 52 is provided, forms in which a primer layer is provided between the substrate for seal section 52 and the receiving layer 55 can be mentioned.

As the primer layer, components that can adjust the percentage of the reflection density of the reference plate having a seal section 70 to be 15% or more can be appropriately selected and used. As the components of the primer layer, polyester type resins, polyacrylic ester type resins, polyvinyl acetate type resins, polyurethane type resins, styrene acrylate type resins, polyacrylamide type resins, polyamide type resins, polyether type resins, polystyrene type resins, polyethylene type resins, polypropylene type resins, vinyl type resins such as polyvinyl chloride resins, polyvinyl alcohol type resins, and polyvinyl pyrrolidone, polyvinyl acetal type resins such as polyvinyl acetoacetal and polyvinyl butyral, inorganic particles, and the like can be enumerated.

The thickness of the primer layer is not particularly limited, and is preferably 0.8 μm or more, more preferably 1 μm or more. The upper limit is not particularly limited, and is of the order of 2.5 μm.

The thickness of the entire seal-type thermal transfer image-receiving sheet 100 is not particularly limited, and is generally in the range of 150 μm or more and 300 μm or less, preferably in the range of 210 μm or more and 220 μm or less.

A colorant or the like may be added to the layers constituting the seal section 50. Addition of a colorant is one of methods for lowering the percentage of the reflection density of the reference plate having a seal section 70 to thereby adjust the see-through feeling of the seal section.

It is possible to adjust the percentage of the reflection density of the reference plate having a seal section 70 by allowing the pressure-adhesive layer 51 and the receiving layer 55, which are essential constituents constituting the seal section 50, or the substrate for seal section 52 and the primer layer, which are described as the optional constituents described above, for example, to contain a colorant. As the colorant, white titanium oxide, carbon black, iron oxide, manganese dioxide, aniline black, and the like can be enumerated. A case in which a colorant is contained in the substrate for seal section 52 or the primer layer is preferable, in respect that the percentage of the reflection density of the reference plate having a seal section 70 can be adjusted while functions originally required from the pressure-adhesive layer 51 and the receiving layer 55 is prevented from being interfered.

The upper limit of the percentage of the reflection density of the reference plate having a seal section 70 is not particularly limited and is 100%. For the purpose of imparting a high see-through feeling to the seal section 50, the percentage of the reflection density of the reference plate having a seal section 70 is preferably 60% or more, more preferably 70% or more, particularly preferably 80% or more.

Meanwhile, for the purpose of imparting a moderate see-through feeling to the seal section 50, the percentage of the reflection density of the reference plate having a seal section 70 is preferably in the range of 15% or more and less than 60%, more preferably in the range of 15% or more and 40% or less, particularly preferably in the range of 20% or more and less than 35%. This also applies to the percentage of the reflection density of the reference plate having a release section 80. As shown in FIG. 4(C), when the seal-type thermal transfer image-receiving sheet 100 and the reference plate 60 are superposed together and the reflection density of the reference plate 60 is measured from the side of the seal section 50, the value of the reflection density may be set within the preferable range described above on the basis of the value of the reflection density of the reference plate 60 alone.

EXAMPLES

Next, the present invention will be described more concretely with reference to examples and comparative examples. Hereinbelow, unless otherwise specified, the expression of part(s) or % means that by mass, being a value before converting to solid content.

Example 1

As a substrate for release section, a polyethylene terephthalate film having a thickness of 100 μm (S100#100, Mitsubishi Plastics, Inc.) was used. A coating liquid for release layer having the following composition was coated onto the substrate for release section so as to obtain a thickness of 0.25 μm in the dried state, and then, the coated liquid was dried to obtain a release section (1), in which a release layer was provided on the substrate for release section. As a substrate for seal section, a polyethylene terephthalate film having a thickness of 75 μm (S100#75, Mitsubishi Plastics, Inc.) was used. A coating liquid for primer layer 1 having the following composition was coated onto one surface of the substrate for seal section so as to obtain a thickness of 1.2 μm in the dried state, and then, the coated liquid was dried to form a primer layer. Onto this primer layer, a coating liquid for receiving layer having the following composition was coated so as to obtain a thickness of 4.2 μm in the dried state, and then, the coated liquid was dried to form a receiving layer. Additionally, onto the other surface of the substrate for seal section, a coating liquid for pressure-adhesive layer having the following composition was coated so as to obtain a thickness of 9 μm in the dried state, and then, the coated liquid was dried to form a pressure-adhesive layer. Thus, a seal section was obtained, in which the primer layer and the receiving layer were provided in the order mentioned on one surface of the substrate for seal section, and the pressure-adhesive layer was provided on the other surface of the substrate for seal section. Subsequently, the release section (1) and the seal section were bonded together such that the release layer of the release section (1) was opposed to the pressure-adhesive layer of the seal section to thereby obtain a seal-type thermal transfer image-receiving sheet of Example 1, in which the release section (1) and the seal section were integrated.
(Coating Liquid for Release Layer)

| | |
|---|---|
| Addition polymerization agent silicone (KS847H, Shin-Etsu Chemical Co., Ltd.) | 100 parts |
| Toluene | 200 parts |

(Coating Liquid for Primer Layer 1)

| | |
|---|---|
| Polyurethane resin | 5.04 parts |
| (N-5199, Nippon Polyurethane Industry Co., Ltd.) | |
| White pigment (anatase type titanium oxide) | 10.08 parts |
| (TCA-888, Sakai Chemical Industry Co., Ltd.) | |
| Isocyanate type curing agent | 2.04 parts |
| (TAKENATE(R) A-14, Mitsui Chemicals, Inc.) | |
| Methyl ethyl ketone | 8 parts |
| Toluene | 8 parts |
| Isopropyl alcohol | 4 parts |

(Coating Liquid for Receiving Layer)

| | |
|---|---|
| Vinyl chloride-vinyl acetate copolymer | 12 parts |
| (#1000A, Denka Co., Ltd.) | |
| Epoxy modified silicone | 0.8 parts |
| (X-22-3000T, Shin-Etsu Chemical Co., Ltd.) | |
| Amino-modified silicone | 0.24 parts |
| (X-22-1660B-3, Shin-Etsu Chemical Co., Ltd.) | |
| Toluene | 30 parts |
| Methyl ethyl ketone | 30 parts |

(Coating Liquid for Pressure-Adhesive Layer)

| | |
|---|---|
| Acryl copolymer | 15 parts |
| (SK-Dyne 1251, Soken Chemical & Engineering Co., Ltd.) | |
| Curing agent | 0.33 parts |
| (Curing agent L-45, Soken Chemical & Engineering Co., Ltd.) | |
| Curing agent | 0.1 parts |
| (E-AX, Soken Chemical & Engineering Co., Ltd.) | |
| Ethyl acetate | 16.14 parts |

Example 2

A seal-type thermal transfer image-receiving sheet of Example 2 was obtained exactly in the same manner as in Example 1 except that the coating liquid for primer layer 1 was replaced by a coating liquid for primer layer 2 having the following composition to form the primer layer.
(Coating Liquid for Primer Layer 2)

| | |
|---|---|
| Polyester resin (solid content: 25%) | 40 parts |
| (VYLONAL(R) MD-1480, TOYOBO CO., LTD.) | |
| Filler | 9 parts |
| (Laponite JS, Wilbur-Ellis) | |
| Surfactant | 0.08 parts |
| (Dynol 604, Shin-Etsu Chemical Co., Ltd.) | |
| Isopropyl alcohol | 60 parts |
| Water | 120 parts |

Example 3

A seal-type thermal transfer image-receiving sheet of Example 3 was obtained exactly in the same manner as in Example 1 except that the coating liquid for primer layer 1 was coated so as to obtain a thickness of 0.8 μm in the dried state, and then, the coated liquid was dried to thereby form the primer layer.

Example 4

A seal-type thermal transfer image-receiving sheet of Example 4 was obtained exactly in the same manner as in Example 1 except that the coating liquid for primer layer 1 was coated so as to obtain a thickness of 1.8 μm in the dried state, and then, the coated liquid was dried to thereby form the primer layer.

Example 5

A seal-type thermal transfer image-receiving sheet of Example 5 was obtained exactly in the same manner as in Example 1 except that the polyethylene terephthalate film having a thickness of 100 μm (S100#100, Mitsubishi Plastics, Inc.) was replaced by a polyethylene terephthalate film having a thickness of 75μm (S100#75, Mitsubishi Plastics, Inc.)to be used, as the substrate for release section constituting the above release section (1), and the polyethylene terephthalate film having a thickness of 75 μm (S100#75, Mitsubishi Plastics, Inc.) was replaced by a polyethylene terephthalate film having a thickness of 50 μm (S100#50, Mitsubishi Plastics, Inc.)to be used, as the substrate for seal section.

Example 6

A seal-type thermal transfer image-receiving sheet of Example 6 was obtained exactly in the same manner as in Example 1 except that the polyethylene terephthalate film having a thickness of 100 μm (S100#100, Mitsubishi Plastics, Inc.) was replaced by a polyethylene terephthalate film having a thickness of 125 μm (S100#125, Mitsubishi Plastics, Inc.)to be used, as the substrate for release section constituting the above release section (1), and the polyethylene terephthalate film having a thickness of 75 μm (S100#75, Mitsubishi Plastics, Inc.) was replaced by a polyethylene terephthalate film having a thickness of 100 μm (S100#100, Mitsubishi Plastics, Inc.)to be used, as the substrate for seal section.

Example 7

As a substrate for release section, a polyethylene terephthalate film having a thickness of 100 μm (S100#100, Mitsubishi Plastics, Inc.) was used. The coating liquid for release layer having the above composition was coated onto one surface of the substrate for release section so as to obtain a thickness of 0.25 μm in the dried state, and then, the coated liquid was dried to form a release layer on the substrate for release section. Then, a coating liquid for back face primer layer 1 having the following composition was coated onto the other surface of the substrate for release section so as to obtain a thickness of 1.2 μm in the dried state, and then, the coated liquid was dried to thereby form a back face primer layer. Subsequently, a coating liquid for back face layer 1 having the following composition was coated onto the back face primer layer so as to obtain a thickness of 0.5 μm in the dried state and then, the coated liquid was dried to thereby form a back face layer. Thus, a release section (2) was obtained, in which the release layer was provided on one surface of the substrate for release section, and the back face primer layer and the back face layer were provided in the order mentioned on the other surface of the substrate for release section. A seal-type thermal transfer image-receiving sheet of Example 7 was obtained exactly in the same manner as in Example 1 except that the release section (1) was replaced by the release section (2).

(Coating Liquid for Back Face Primer Layer 1)

| | |
|---|---|
| Polyester resin (solid content: 25%) | 40 parts |
| (VYLONAL(R) MD-1480, TOYOBO CO., LTD.) | |
| Filler | 9 parts |
| (Laponite JS, Wilbur-Ellis) | |
| Surfactant | 0.08 parts |
| (Dynol 604, Shin-Etsu Chemical Co., Ltd.) | |
| Isopropyl alcohol | 60 parts |
| Water | 120 parts |

(Coating Liquid for Back Face Layer 1)

| | |
|---|---|
| Polyvinyl butyral resin | 10 parts |
| (Denka Butyral 3000-1, Denka Co., Ltd.) | |
| Silicon dioxide | 7.4 parts |
| (Sylysia 380, Fuji Silysia Chemical Ltd.) | |
| Titanium chelate (AT chelating agent, DENKAPOLYMER KABUSHIKI KAISHA) | 0.32 parts |
| Toluene | 54 parts |
| Isopropyl alcohol | 54 parts |

Example 8

As a substrate for release section, a polyethylene terephthalate film having a thickness of 100 μm (S100#100, Mitsubishi Plastics, Inc.) was used. The coating liquid for release layer having the above composition was coated onto one surface of the substrate for release section so as to obtain a thickness of 0.25 μm in the dried state, and then, the coated liquid was dried to form a release layer on the substrate for release section. Then, a coating liquid for back face primer layer 2 having the following composition was coated onto the other surface of the substrate for release section so as to obtain a thickness of 0.1 μm in the dried state, and then, the coated liquid was dried to thereby form a back face primer layer. Subsequently, a coating liquid for back face layer 2 having the following composition was coated onto the back face primer layer so as to obtain a thickness of 0.7 μm in the dried state and then, the coated liquid was dried to thereby form a back face layer. Thus, a release section (3) was obtained, in which the release layer was provided on one surface of the substrate for release section, and the back face primer layer and the back face layer were provided in the order mentioned on the other surface of the substrate for release section. A seal-type thermal transfer image-receiving sheet of Example 8 was obtained exactly in the same manner as in Example 1 except that the release section (1) was replaced by the release section (3).

(Coating Liquid for Back Face Primer Layer 2)

| | |
|---|---|
| Urethane resin | 100 parts |
| (OPT primer, SHOWA INK MANUFACTURING CO., LTD) | |
| Isocyanate type curing agent | 5 parts |
| (OPT curing agent, SHOWA INK MANUFACTURING CO., LTD) | |

(Coating Liquid for Back Face Layer 2)

| | |
|---|---|
| Polyvinyl butyral resin | 10 parts |
| (Denka Butyral 3000-1, Denka Co., Ltd.) | |
| Nylon filler (average particle size: 7.5 μm) | 2 parts |
| (MW330, SHINTO PAINT CO., LTD.) | |
| Pt catalyst | 0.44 parts |
| (CAT-PL-50T, Shin-Etsu Chemical Co., Ltd.) | |
| Reaction retarder | 0.36 parts |
| (CAT-PLR-5, Shin-Etsu Chemical Co., Ltd.) | |
| Titanium chelate (AT chelating agent, DENKAPOLYMER KABUSHIKI KAISHA) | 2.4 parts |
| Toluene | 30 parts |
| Isopropyl alcohol | 30 parts |

Example 9

As a substrate for release section, a polyethylene terephthalate film having a thickness of 100 μm (S100#100, Mitsubishi Plastics, Inc.) was used. The coating liquid for release layer having the above composition was coated onto one surface of the substrate for release section so as to obtain a thickness of 0.25 μm in the dried state, and then, the coated liquid was dried to form a release layer on the substrate for release section. Then, the coating liquid for back face primer layer 1 having the above composition was coated onto the other surface of the substrate for release section so as to obtain a thickness of 1.2 μm in the dried state, and then, the coated liquid was dried to thereby form a back face primer layer. Subsequently, a coating liquid for back face layer 3 having the following composition was coated onto the back face primer layer so as to obtain a thickness of 2.5 μm in the dried state and then, the coated liquid was dried to thereby form a back face layer. Thus, a release section (4) was obtained, in which the release layer was provided on one surface of the substrate for release section, and the back face primer layer and the back face layer were provided in the order mentioned on the other surface of the substrate for release section. A seal-type thermal transfer image-receiving sheet of Example 9 was obtained exactly in the same manner as in Example 1 except that the release section (1) was replaced by the release section (4).

(Coating Liquid for Back Face Layer 3)

| | |
|---|---|
| Polyvinyl butyral resin | 100 parts |
| (Denka Butyral 3000-1, Denka Co., Ltd.) | |
| Microsilica | 100 parts |
| (Sylysia 730, Fuji Silysia Chemical Ltd.) | |
| Microsilica | 50 parts |
| (Sylysia 310, Fuji Silysia Chemical Ltd.) | |
| Nylon filler (average particle size: 7.5 μm) | 30 parts |
| (MW330, SHINTO PAINT CO., LTD.) | |
| Titanium chelate (AT chelating agent, DENKAPOLYMER KABUSHIKI KAISHA) | 12 parts |
| Toluene | 590 parts |
| Isopropyl alcohol | 590 parts |

Example 10

As a substrate for release section, a polyethylene terephthalate film having a thickness of 100 μm (S100#100, Mitsubishi Plastics, Inc.) was used. The coating liquid for release layer having the above composition was coated onto one surface of the substrate for release section so as to obtain a thickness of 0.25 μm in the dried state, and then, the coated liquid was dried to form a release layer on the substrate for release section. Then, a coating liquid for back face primer layer 3 having the following composition was coated onto the other surface of the substrate for release section so as to obtain a thickness of 1.2 μm in the dried state, and then, the coated liquid was dried to thereby form a back face primer layer. Subsequently, the coating liquid for back face layer 3 having the above composition was coated onto the back face primer layer so as to obtain a thickness of 2.5 μm in the dried state and then, the coated liquid was dried to thereby form a back face layer. Thus, a release section (5) was obtained, in which the release layer was provided on one surface of the substrate for release section, and the back face primer layer and the back face layer were provided in the order mentioned on the other surface of the substrate for release section. A seal-type thermal transfer image-receiving sheet of Example 10 was obtained exactly in the same manner as in Example 1 except that the release section (1) was replaced by the release section (5).

(Coating Liquid for Back Face Primer Layer 3)

| | |
|---|---|
| Polyurethane resin (N-5199, Nippon Polyurethane Industry Co., Ltd.) | 5.04 parts |
| White pigment (anatase type titanium oxide) (TCA-888, Sakai Chemical Industry Co., Ltd.) | 10.08 parts |
| Isocyanate type curing agent (TAKENATE(R) A-14, Mitsui Chemicals, Inc.) | 2.04 parts |
| Methyl ethyl ketone | 8 parts |
| Toluene | 8 parts |
| Isopropyl alcohol | 4 parts |

Example 11

As a substrate for release section, a polyethylene terephthalate film having a thickness of 100 μm (S100#100, Mitsubishi Plastics, Inc.) was used. The coating liquid for release layer having the above composition was coated onto one surface of the substrate for release section so as to obtain a thickness of 0.25 μm in the dried state, and then, the coated liquid was dried to form a release layer on the substrate for release section. Then, the coating liquid for back face primer layer 3 having the above composition was coated onto the other surface of the substrate for release section so as to obtain a thickness of 1.2 μm in the dried state, and then, the coated liquid was dried to thereby form a back face primer layer. Subsequently, a coating liquid for back face layer 4 having the following composition was coated onto the back face primer layer so as to obtain a thickness of 1.5 μm in the dried state and then, the coated liquid was dried to form a back face layer. Thus, release section (6) was obtained, in which the release layer was provided on one surface of the substrate for release section, and the back face primer layer and the back face layer were provided in the order mentioned on the other surface of the substrate for release section. A seal-type thermal transfer image-receiving sheet of Example 11 was obtained exactly in the same manner as in Example 1 except that the release section (1) was replaced by the release section (6).

(Coating Liquid for Back Face Layer 4)

| | |
|---|---|
| Polyvinyl butyral resin (Denka Butyral 3000-1, Denka Co., Ltd.) | 10 parts |
| Polyvinyl pyrrolidone resin (K-90, ISP Japan Ltd.) | 6 parts |
| Silicone modified resin (DAIALLOMER SP-712, Dainichiseika Color & Chemicals Mfg. Co., Ltd.) | 32 parts |
| Amino acid filler (Amihope(R) LL, AJINOMOTO CO., INC.) | 10 parts |
| Nylon filler (average particle size: 7.5 μm) (MW330, SHINTO PAINT CO., LTD.) | 10 parts |
| Titanium chelate (AT chelating agent, DENKAPOLYMER KABUSHIKI KAISHA) | 1.86 parts |
| Toluene | 88.7 parts |
| Isopropyl alcohol | 88.7 parts |
| Methyl ethyl ketone | 88.7 parts |

Comparative Example 1

As a substrate for release section, a void-containing polyester film having a thickness of 100 μm (K1212, TOYOBO CO., LTD.) was used. The coating liquid for release layer having the above composition was coated onto the substrate for release section so as to obtain a thickness of 0.25 μm in the dried state, and then, the coated liquid was dried to obtain a release section in which a release layer was provided on the substrate for release section. Then, a coating liquid for adhesive layer having the following composition was coated onto a polyethylene terephthalate film having a thickness of 75 μm (FK202, TOYOBO CO., LTD.) so as to obtain a thickness of 2.5 μm in the dried state, and then, the coated liquid was dried to form an adhesive layer. A biaxially oriented polypropylene film having a thickness of 30 μm (OPP)(FOS-BT, Futamura Chemical Co., Ltd.) was bonded onto this adhesive layer to thereby obtain a substrate for seal section, in which the polyethylene terephthalate film having a thickness of 75 μm and the biaxially oriented polypropylene film having a thickness of 30 μm were bonded together. The coating liquid for primer layer 1 having the above composition was coated onto the polyethylene terephthalate film in this substrate for seal section so as to obtain a thickness of 1.2 μm in the dried state, and then, the coated liquid was dried to form a primer layer. The coating liquid for receiving layer having the above composition was coated onto this primer layer so as to obtain a thickness of 4.2 μm in the dried state, and then, the coated liquid was dried to form a receiving layer. Additionally, the coating liquid for pressure-adhesive layer having the above composition was coated onto the biaxially oriented polypropylene film in the substrate for seal section so as to obtain a thickness of 9 μm in the dried state, and then, the coated liquid was dried to form a pressure-adhesive layer. Thus, a seal section was obtained, in which the primer layer and the receiving layer were provided in the order mentioned on one surface of the substrate for seal section, and the pressure-adhesive layer was provided on the other surface of the substrate for seal section. Subsequently, the release section and the seal section were bonded together such that the release layer of the release section was opposed to the pressure-adhesive layer of the seal section to thereby obtain a seal-type thermal transfer image-receiving sheet of Comparative Example 1, in which the release section and the seal section were integrated.

<Coating Liquid for Adhesive Layer>

| | |
|---|---|
| Polyfunctional polyol (TAKELAC(R) A-969-V, Mitsui Chemicals, Inc.) | 30 parts |
| Isocyanate type curing agent (TAKENATE(R) A-5, Mitsui Chemicals, Inc.) | 10 parts |
| Ethyl acetate | 60 parts |

Comparative Example 2

A seal-type thermal transfer image-receiving sheet of Comparative Example 2 was obtained exactly in the same manner as in Comparative Example 1 except that the coating liquid for primer layer 1 was replaced by the coating liquid for primer layer 2 having the above composition to form the primer layer.

(Measurement of Reflection Density 1 (Percentage of Reflection Density of Seal Section Alone))

In the seal-type thermal transfer image-receiving sheet of each of Examples and Comparative Examples, the seal section was peeled off from the release section. The seal section peeled off from the release section was superposed on a black calibration plate (as a reference plate) of a reflection densitometer (RD-918, X-Rite Inc.) such that the black calibration plate was opposed to the pressure-adhesive layer of the seal section. The reflection densitometer (RD-918, X-Rite Inc.) was used to measure the reflection density of the black calibration plate from the side of the seal section. The reflection density of the black calibration plate before the superposition with the seal section (the reflection density of the black calibration plate alone) was 1.81. The percentage of the value measured above on the basis of the value of the reflection density of the black calibration plate alone is shown in Table 1.

(Measurement of Reflection Density 2 (Percentage of Reflection Density of Release Section Alone))

In the seal-type thermal transfer image-receiving sheet of each of Examples and Comparative Examples, the seal section was peeled off from the release section. The release section from which the seal section was peeled off and the black calibration plate (as a reference plate) of a reflection densitometer (RD-918, X-Rite Inc.) were superposed together such that the black calibration plate was in contact with the surface opposite to the surface on which the release layer of the release section was provided. The reflection densitometer (RD-918, X-Rite Inc.) was used to measure the reflection density of the black calibration plate from the side of the release section. The reflection density of the black calibration plate before the superposition with the release section (the reflection density of the black calibration plate alone) was 1.81. The percentage of the value measured above on the basis of the value of the reflection density of the black calibration plate alone is shown in Table 1.

(Measurement of Reflection Density 3 (Percentage of Reflection Density of Entire Seal-Type Thermal Transfer Image-Receiving Sheet))

The seal-type thermal transfer image-receiving sheet of each of Examples and Comparative Examples and the black calibration plate (as a reference plate) of a reflection densitometer (RD-918, X-Rite Inc.) were superposed together such that the black calibration plate was in contact with the release section. The reflection densitometer (RD-918, X-Rite Inc.) was used to measure the reflection density of the black calibration plate from the side of the seal-type thermal transfer image-receiving sheet. The reflection density of the black calibration plate before the superposition with the seal-type thermal transfer image-receiving sheet (the reflection density of the black calibration plate alone) was 1.81. The percentage of the value measured above on the basis of the value of the reflection density of the black calibration plate alone is shown in Table 1.

(See-Through Feeling Evaluation)

With respect to the seal-type thermal transfer image-receiving sheet of each of Examples and Comparative Examples, the see-through feeling of the seal section peeled off from the release section, the see-through feeling of the release section peeled off from the seal section, and the see-through feeling of the entire seal-type thermal transfer image-receiving sheet were visually observed, and the see-through feeling evaluation was conducted based on the following evaluation criteria. The evaluation test results are shown in Table 1.

"Evaluation Criteria"

A1: Having a see-through feeling and high designability

A2: Having a moderate see-through feeling and high designability

NG: Having substantially no see-through feeling and poor designability (Measurement of Friction Coefficient)

The friction coefficient between the surfaces on the side of the release section of the seal-type thermal transfer image-receiving sheet of each of Examples and Comparative Examples was measured by a method in compliance with JIS-P-8147 (2010). As the measurement apparatus, a surface property tester (HEIDON14DR, Shinto Scientific Co., Ltd.) was used. The measurement results of the friction coefficient are shown in Table 1.

(Conveyance Evaluation)

A printer (S2195, SINFONIA TECHNOLOGY CO., LTD.) was used to form an image (R, G, B=127, 127, 127) on the receiving layer of the seal-type thermal transfer image-receiving sheet of each of Examples and Comparative Examples. The surface of the receiving layer of the seal-type thermal transfer image-receiving sheet of each of Examples and Comparative Examples after the image formation was visually observed, and conveyance evaluation was conducted based on the following evaluation criteria.

"Evaluation Criteria"

A: No wrinkles have occurred due to defective conveyance on the surface of the image.

B: Defective conveyance occurred inside the printer during image formation, and wrinkles have occurred due to defective conveyance on the surface of the image.

TABLE 1

| | Seal section alone | | Release section alone | | Entire seal-type thermal transfer image-receiving sheet | | | |
|---|---|---|---|---|---|---|---|---|
| | Percentage of reflection density | See-through feeling | Percentage of reflection density | See-through feeling | Percentage of reflection density | See-through feeling | Friction coefficient | Conveyance |
| Example 1 | 26.7% | A2 | 99.4% | A1 | 26.7% | A2 | 0.18 | B |
| Example 2 | 93.9% | A1 | 99.4% | A1 | 93.9% | A1 | 0.18 | B |
| Example 3 | 30.4% | A2 | 99.4% | A1 | 30.4% | A2 | 0.18 | B |
| Example 4 | 22.5% | A2 | 99.4% | A1 | 22.5% | A2 | 0.18 | B |
| Example 5 | 26.7% | A2 | 99.4% | A1 | 26.7% | A2 | 0.18 | B |
| Example 6 | 26.7% | A2 | 99.4% | A1 | 26.7% | A2 | 0.18 | B |
| Example 7 | 26.7% | A2 | 45.9% | A2 | 26.7% | A2 | 0.24 | A |
| Example 8 | 26.7% | A2 | 97.8% | A1 | 26.0% | A2 | 0.29 | A |

TABLE 1-continued

|  | Seal section alone | | Release section alone | | Entire seal-type thermal transfer image-receiving sheet | | | |
| --- | --- | --- | --- | --- | --- | --- | --- | --- |
|  | Percentage of reflection density | See-through feeling | Percentage of reflection density | See-through feeling | Percentage of reflection density | See-through feeling | Friction coefficient | Conveyance |
| Example 9 | 26.7% | A2 | 39.8% | A2 | 24.3% | A2 | 0.27 | A |
| Example 10 | 26.7% | A2 | 21.0% | A2 | 18.2% | A2 | 0.27 | A |
| Example 11 | 26.7% | A2 | 19.3% | A2 | 17.1% | A2 | 0.08 | B |
| Comparative Example 1 | 2.2% | NG | 3.3% | NG | 2.2% | NG | 0.24 | A |
| Comparative Example 2 | 3.3% | NG | 3.3% | NG | 3.3% | NG | 0.24 | A |

REFERENCE SIGNS LIST

100 Seal-type thermal transfer image-receiving sheet
10 Release section
10A Substrate for release section
10B Release layer
50 Seal section
51 Pressure-adhesive layer
52 Substrate for seal section
53 Receiving layer capable of receiving a sublimable dye
60 Reference plate
70 Reference plate having a seal section
80 Reference plate having a release section

The invention claimed is:

1. A seal-type thermal transfer image-receiving sheet comprising:
   a release section; and
   an integrated seal section;
   wherein the seal section is provided peelably from the release section,
   wherein the seal section has a layered structure in which a pressure-adhesive layer, a primer layer, and a receiving layer capable of receiving a sublimable dye are layered, in that order, from a side of the release section, and
   wherein the primer layer contains a colorant,
   wherein, when the seal section is peeled off from the release section, a reference plate and the peeled off seal section are superposed together, and a reflection density of the reference plate is measured through the seal section from the side of the seal section, a value of the reflection density is in a range of 15% or more to 40% or less of a reflection density of the reference plate alone,
   wherein, when the reference plate and the seal-type thermal transfer image-receiving sheet are superposed together, and a reflection density of the reference plate is measured through the seal-type thermal transfer image-receiving sheet from the side of the seal-type thermal transfer image receiving sheet, the value of the reflection density is in a range of 15% or more to 40% or less of the reflection density of the reference plate alone,
   wherein a color of the reference plate is black, and a reflection density of the reference plate is 1.81,
   wherein the release section includes a back face layer located on a outermost surface on a side not in contact with the seal section, and
   wherein the back face layer contains at least one of porous silica particles and nylon particles.

2. The seal-type thermal transfer image-receiving sheet according to claim 1, wherein, when the reference plate and the release section from which the seal section is peeled off are superposed together and a reflection density of the reference plate is measured through the release section from the side of the release section, the value of the reflection density is in a range of 15% or more to 40% or less of the reflection density of the reference plate alone.

3. The seal-type thermal transfer image-receiving sheet according to claim 1, wherein a dynamic friction coefficient between surfaces of the release section not located on the side of the seal section is 0.24 or more, the dynamic friction coefficient being measured in compliance with JIS-P-8147 (2010).

* * * * *